INVENTOR.
WALTER TRAUPEL
BY [signature]
ATTORNEY.

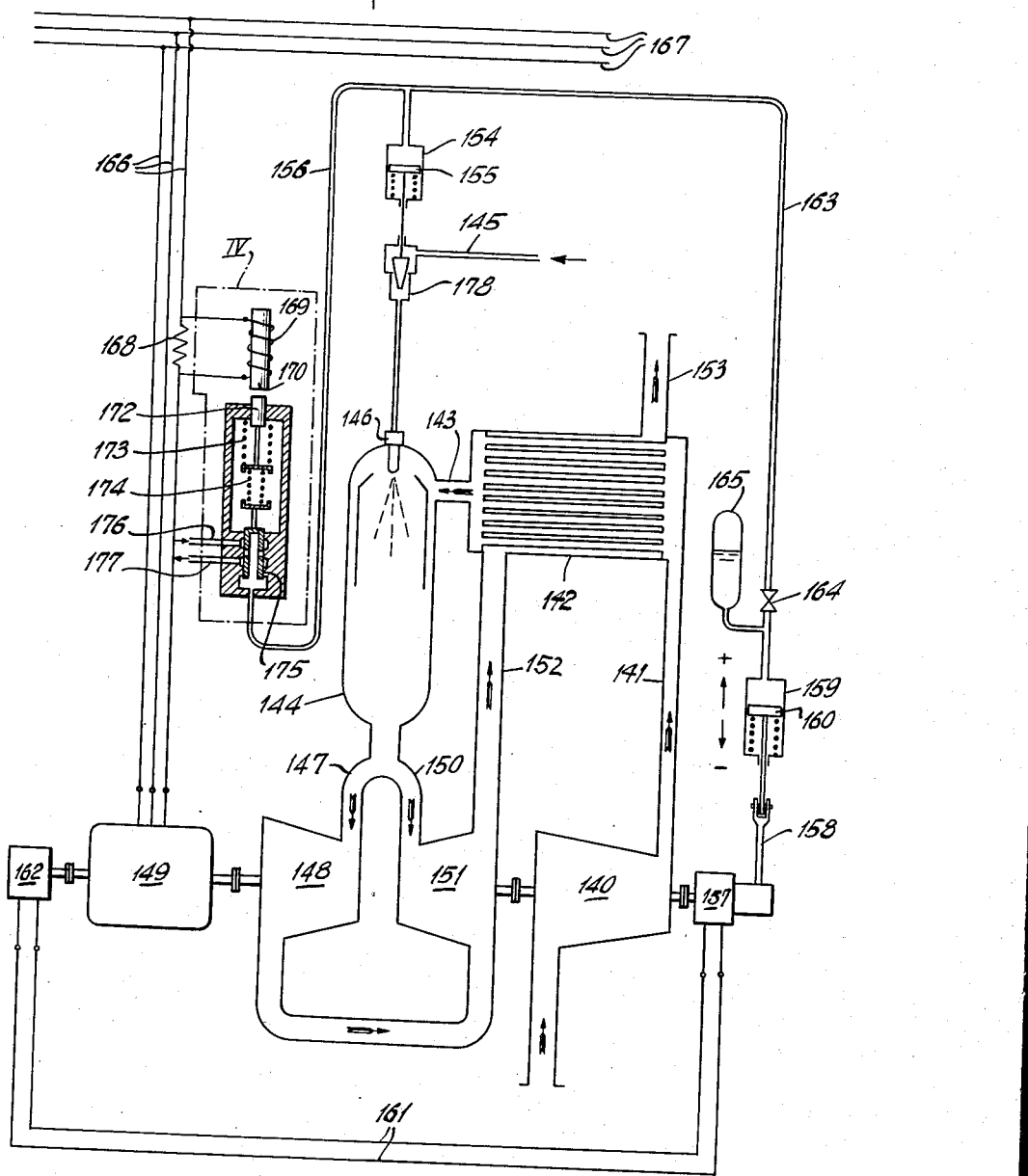

Patented Jan. 12, 1954

2,665,548

UNITED STATES PATENT OFFICE 2,665,548

APPARATUS FOR CONTROLLING THE POWER OUTPUT OF GAS TURBINE PLANTS

Walter Traupel, Winterthur, Switzerland, assignor to Sulzer Freres, Societe Anonyme, Winterthur, Switzerland, a corporation of Switzerland Application June 24, 1950, Serial No. 170,148

Claims priority, application Switzerland June 30, 1949

14 Claims. (Cl. 60—39.15)

The present invention relates to an apparatus for controlling a gas turbine plant having at least one turbine producing useful work and at least one gas turbine, which is mechanically independent of the first turbine and drives a compressor.

It is known to control the output of gas turbine plants by regulating the heat supply to the working medium circulating through the plant and by controlling also the pressure conditions in the plant. This conventional method is not satisfactory, particularly not in plants for driving frequency controlled electric generators supplying alternating current power systems. Such systems serve a number of individual consumer groups which are independent of one another, and the load on such systems increases and decreases rapidly at certain periods, and increases slowly and remains steady at others. The current generators, however, must maintain an exactly regulated frequency at all times and demand maintenance of a constant speed of the prime movers operating the generators.

Modern gas turbine plants have numerous conduits and large heat exchangers for obtaining a high thermal efficiency and consequently contain a large volume of working medium. A control apparatus involving continual rapid changes of the pressure of the working medium for satisfying load fluctuations of short duration entails great losses, because it continually changes the energy content of the plant. The pressure in the plant can be changed only slowly because of its great internal volume. It is therefore necessary to compensate rapidly passing load variations by changing the heat supply to the working medium before it enters the turbines. Such a control has the disadvantage that the temperature of the working medium is changed. A reduction of this temperature during long periods reduces the thermal efficiency of the plant, and increase of the temperature is limited by the heat resistance of the blading material of the turbines.

It is an object of the present invention to provide a control apparatus which avoids the aforementioned disadvantages and which is characterized by a regulation of the heat supply to a heater for the working medium, from which the medium enters one of the turbines, in direct dependence on an operating condition of the prime mover, and by regulating the pressure condition in the plant in dependence on the same condition but delayed with respect to the regulation of the heat supply. This delayed action has the effect that only relatively slow changes of load, i. e. changes whose speed is, say, less than one third of the speed at which average changes occur, effect actuation of the pressure control whereby a load variation of greater duration is eventually compensated by the pressure regulation, and a change of the temperature of the working medium, which may have occurred, is annulled by a reduction or increase in the turnover of the operating medium in the plant.

The apparatus according to the invention comprises heat supply control means for controlling heating of the working medium before it enters a turbine, a device for controlling the pressure in the plant, an impulse giver or producer which is affected by an operating condition of the prime mover, impulse transmitters for transmitting the pulses from said producer to the heat supply control means and to the pressure control device, and a delaying device interposed in the transmitter between the impulse producer and the pressure control device.

The combustion chamber for supplying heat to the working medium may comprise control means for supplementally controlling the heat supply in dependence on the pressure of the working medium in or near the combustion chamber. This may be done by providing a pressure controlled valve means in the fuel supply conduit to the combustion chamber. In gas turbine plants in which at least one turbine comprises a conduit by-passing at least the first turbine stage, the pressure control means may actuate a valve means in said by-pass conduit.

The aforementioned delaying device may consist of a throttling means in the impulse transmitter conduit. If the impulses are transmitted by way of a fluid, the delaying device may consist of an air chamber communicating with the transmitter conduit.

Further and other objects of the present invention will be hereinafter set forth in the accompanying specification and claims, and are shown in the drawings which, by way of illustration, show what I now consider to be preferred embodiments of the invention.

In the drawings:

Fig. 2 is a diagrammatic lay-out of a modified plant according to the invention.

Figure 1:
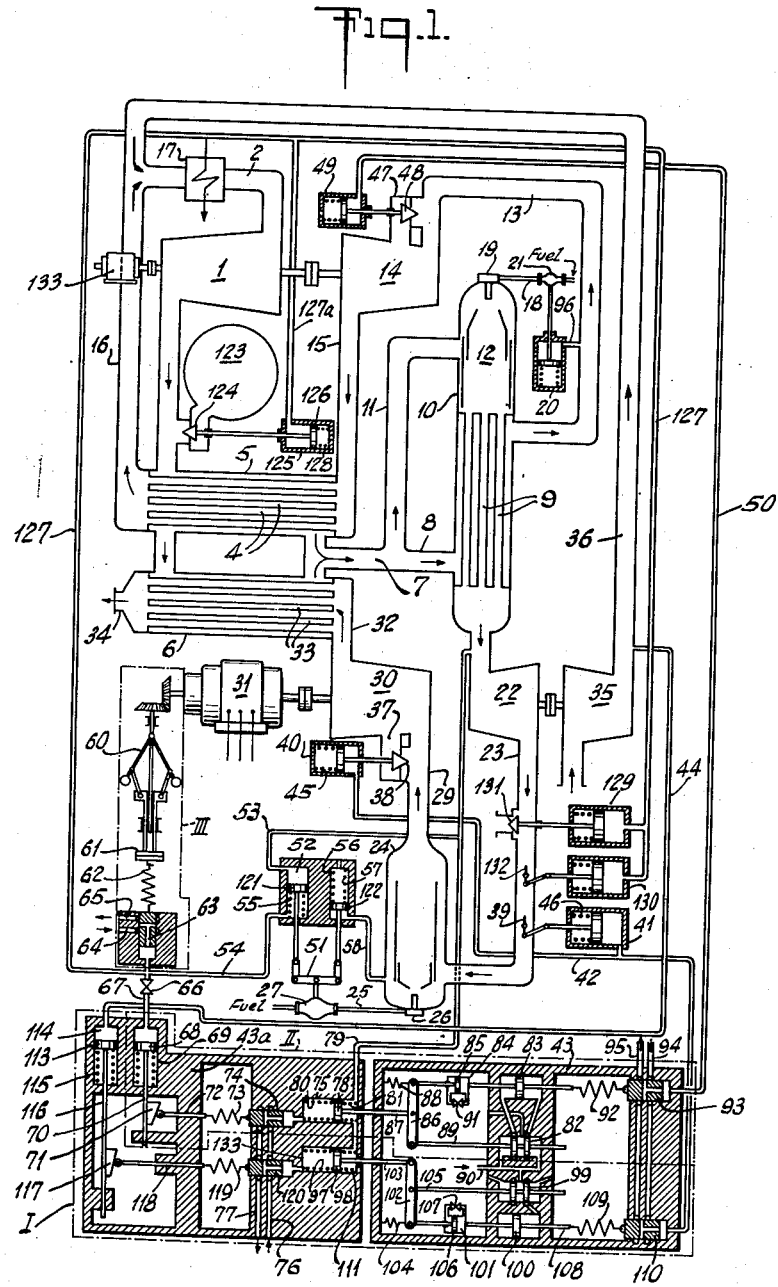
Fig. 1 is a diagrammatic lay-out of a plant according to the invention.

Referring more particularly to Fig. 1 of the drawings, 1 designates a compressor drawing air from conduit 2 and forcing it through conduit 3 into the space surrounding tubes 4 of heat exchanger 5. A portion of the air pre-heated in heat exchanger 5 is further heated in heat exchanger 6 and united with the other portion, which is not further heated, in conduit 7. A portion of the so pre-heated air flows through conduit 8 into the space surrounding tubes 9 of a gas heater 10, the other portion flowing through conduit 11 into the combustion chamber 12 of the heater 10. The air flowing through conduit 8 and heated by the tubes 9 passes through a conduit 13 into turbine 14, expands therein, and is conducted through conduit 15 into the tubes 4 of heat exchanger 5, in which a portion of the heat still contained in the air after its expansion is transferred to the air from conduit 3, which air was compressed in compressor 1. The expanded and cooled air flows from the heater 5 through conduit 16 to a cooler 17 and recirculates through conduit 2 into the compressor 1.

A portion of the air removed through conduit 11 from the above described circuit serves for burning fuel supplied through conduit 18 which is finely divided in nozzle 19. The fuel supply is controlled by a valve means 21 inserted in conduit 18 and actuated by a servomotor 20. The hot mixture of air and combustion gases flows through the tube system 9 of the gas heater 10 and transfers a part of its heat to the air coming, through conduit 8, from the heat exchangers 4 and 6 and flowing around the tube system 9. The so cooled gas mixture enters the charging turbine 22, is expanded therein to an intermediate pressure, and conducted through pipeline 23 into a gas reheater 24. Here, a part of the oxygen still contained in the mixture is used for burning fuel supplied through conduit 25 and finely divided in burner 26. The amount of fuel supplied is controlled by valve means 27 in conduit 25. The reheated gas mixture is conducted through pipeline 29 into turbine 30 where it is expanded to substantially atmospheric pressure for producing power and driving a machine 31, which is, in the example illustrated, an alternating current generator.

The exhaust gases from turbine 30 are conducted through tube system 33 of heat exchanger 6, where a part of the heat still contained in the mixture is transferred to a part of the air circulating through the circuit described supra and compressed in compressor 1. Thereupon the mixture leaves the plant through an exhaust conduit 34.

To replace the air withdrawn through conduit 11, air is drawn from the atmosphere by a charging compressor 35, which is driven by the charging turbine 22, and introduced into the cycle, in compressed state, through conduit 36.

For adjusting the amount of working medium flowing through the prime mover turbine 30, a valve means 38 is provided in a passage 37 by-passing the first stages of the turbine, and a further valve means 39 is provided in conduit 23. Valve means 38 is actuated by a servomotor 40 and valve means 39 is actuated by a servomotor 41, both servomotors being operated by an operating medium, for example oil, conducted thereto by impulse transmitting conduit 42. The pressure of the oil is regulated by a control device, surrounded by a dash-dot line and designated by I in Fig. 1. This control device is contained in a casing 43, 43a and is actuated by the pressure of the working medium in the exhaust line of the charging compressor 35, which pressure is transmitted to the control device by means of conduit 44. The elasticity or constants of springs 45 and 46 counterbalancing the pistons in servomotors 40 and 41, respectively, are so chosen that a gradual increase of the pressure medium in conduit 42 will actuate servomotor 41 to fully open valve 39 before valve 38 is opened by servomotor 40. Increase of the flow area in pipeline 23 caused by opening valve 39 and in passage 37 due to opening of valve 38 reduces the pressure at the outlet of charging turbine 22 and increases the heat drop available in said turbine. This causes speeding up of turbine 22 and of the charging compressor 35 driven thereby and consequently an increase of the discharge pressure of the compressor; vice versa, a reduction of the aforementioned flow areas causes a reduction of the discharge pressure of the charging compressor.

A starting motor 133 is provided for driving compressor 1 for starting the plant.

Turbine 14, which drives compressor 1, for controlling circulation and pressure in the air circuit, is provided with a passage 47 by-passing the first stages of the turbine, and the flow of air through the passage is controlled by valve means 48. The latter is operated by a servomotor 49 which is actuated by a pressure fluid, for example oil, in impulse transmitting conduit 50, which is connected with the servomotor. The pressure of the fluid is controlled by a control device II, which is actuated by impulse generator III. Device II is contained in casing 43, 43a, as is device I.

The fuel supply to burner 26 of the gas heater 24 is controlled by actuation of a lever 51 which is pivoted to the stem of valve 27 which may be constructed similarily to valve 178 of the system illustrated in Fig. 2. The left end of lever 51 is movably connected with piston 121 of servomotor 52. The chamber above piston 121 communicates through conduit 53 with the inlet of charging turbine 22. The chamber below the piston is connected, through conduit 54, with the impulse generator III and is filled with fluid whose pressure is controlled by the impulse generator. Piston 121 is yieldingly forced into middle position in its cylinder by means of a spring 55. The right end of lever 51 is connected with piston 122 of servomotor 56. The chamber below piston 122 communicates with the reheater 24 through conduit 58, and the pressure in the chamber is counterbalanced by spring 57.

The fuel supply to gas heater 10 is adjusted by operation of valve 21 which is actuated by a servomotor 20 which communicates through conduit 96 with the interior of pipeline 13 and is therefore responsive to the admission pressure of turbine 14. This pressure acts on the top side of a piston in the servomotor and is counterbalanced by a spring.

The impulse generator III is actuated by a centrifugal governor 60 driven by the shaft of the machine 31. Sleeve 61 of the governor 60 is connected with a piston valve 63 by a spring 62. This valve controls, in the conventional manner, admission and relief of a control fluid to and from a conduit below the valve according to the tension of spring 62, which is controlled by governor 60. The control fluid, for example oil, is supplied to the valve through a conduit 64 and leaves the valve through a conduit 65, conduit 64 being supplied from a source of fluid having constant pressure, which source is not shown as this is conventional and not part of the invention.

Each change of speed of the machine 31 caused by a change of load on the machine effects a change of pressure of the control fluid below valve 63; this pressure is transferred through conduit 54 to the chamber below piston 121 of servomotor 52. The latter actuates fuel supply valve 27 in such a way that the fuel supply to heater 24 is increased if the speed of the machine 31 decreases because of increased load thereon and the fuel supply is reduced upon an increase of the speed of machine 31 caused by a decrease of load thereon.

In this way, every change of load on the prime mover is taken care of by a corresponding change of temperature of its operating medium, a sudden increase of load being compensated by an increase of the temperature and a reduction of the load causing a reduction of the temperature.

However, the temperature cannot be permitted to remain at its so adjusted value because a greatly increased temperature causes too much thermal stress on the turbine blades and a much lowered temperature reduces the efficiency of the power plant. Therefore, according to the invention, every change of load is subsequently controlled by changing the pressure of the working medium.

For accomplishing the aforestated object of the invention, the pressure of the control fluid, which is adjusted by slide valve 63 in dependence on the speed of the prime mover, is supplementally controlled by a throttle means 66 and transmitted through a conduit 67 to the top side of piston 68 of servomotor 69. Throttle 66 causes a delay of the transmission of the control impulses generated in device III to regulator II, so that piston 68 is displaced slowly and regulator II is actuated only if the load remains changed. Piston 68 displaces a cam 71 with which it is connected by means of a piston rod 70. Cam 71 actuates a cam follower 72 which is connected with a slide valve 74 by means of a spring 73. Compression of the latter and consequently the position of valve 74 depends on the position of cam 71. Valve 74 controls the supply and discharge of a control fluid through conduits 76 and 77, respectively, to and from the cylinder chamber of a servomotor 75, which chamber is closed by a piston 78. The pressure of the working medium operating charging turbine 22 acts on the distal side of piston 78, the pressure being transmitted to piston 78 by means of a conduit 79; at steady load conditions, piston 78 is held in its middle position by springs 80 and 81. Piston 78 actuates a pressure fluid control valve 82 of a servomotor comprising a piston 83. For this purpose, piston rod 87 pivotally supports a lever 86, one arm of which is connected by rod 89 with valve 82 and the other arm of which is connected with piston 83 via a dashpot device 84, comprising a piston 85 and a throttle 91 in the connection between the piston chambers. Valve 82 controls flow of control fluid from conduit 90 into the chambers adjacent to piston 83. Conduit 90 is conected with a source of a control fluid whose pressure is maintained in the conventional manner. Spring 88, one end of which is connected with the arm of lever 86 connected with piston 83 and the other end of which is fixed to casing 43, tends to return valve 82 to its neutral position, whereby piston 85 moves relative to cylinder 84 and piston 83 stays in the adjusted position. Movement of piston 85 is dampened by the throttle 91.

The aforedescribed yielding return motion, which prevents over-regulation and hunting, comes to rest only if the device is in neutral position, i. e. if the pressure at the inlet of turbine 22 is the same as the pressure of the control fluid at the left side of piston 78. Piston 83 is connected by means of a piston rod with a spring 92 and the latter with a slide valve 93 controlling flow of a control fluid through a conduit 94 and return thereof to its source through conduit 95, to and from one side of a piston in servomotor 49 which is connected with valve 93 by means of conduit 50. Conduit 94 is connected to a conventional source of supply of operating fluid under constant pressure, and conduit 95 returns the fluid to said source. Cam 71 is so shaped that the pressure of the control fluid in conduit 50, upon actuation of valve 93, increases if rod 70 moves downward because of increased pressure above piston 68 causing cam follower 72 to actuate valve 74 to increase the pressure on the left side of piston 78. Increased pressure in conduit 50 causes opening of valve 48 in by-pass 47 of turbine 14 and speeding up of the latter and of compressor 1 driven thereby. This causes increase of pressure of the working fluid in the primary or air cycle and subsequently in the whole plant, increasing the output of the plant. Downward movement of rod 70 was due to a decreased speed of prime mover 31. This speed is now brought back to normal. Vice versa, increase of the speed of the prime mover causes a reduction of the pressure in conduit 50, closing of valve 48, slowing down of turbine 14 and of compressor 1, and consequently reduction of the pressure of the working fluid in the entire plant.

The pressure in the air cycle of the plant, which is regulated as described in the paragraph next above, acts through conduit 96 on the piston of servomotor 29 of fuel valve 21 and increases and reduces the fuel supply to gas heater 10 depending on whether the pressure of the working medium is increased or decreased. The pressure of the working medium acts on the pistons of servomotors 52 and 75 through conduits 53 and 79; increasing pressure returns these pistons to their neutral positions.

The right side of the piston chamber in servomotor 75 of regulator II communicates with the right side of piston chamber 133 of regulator I and with conduit 79 which transmits the pressure of the working fluid at the inlet of charging turbine 22 to the regulators. Piston 98 is connected through piston rod 103, lever 102 pivoted thereto, and rod 105 pivoted to lever 102, with a piston valve 99 controlling flow of control fluid from conduit 90 selectively to the sides of a servomotor piston 100 and returns the fluid in conventional manner to the source from which conduit 90 is supplied. Piston 100 is rigidly connected with dash-pot cylinder 101 containing piston 106 which is connected to lever 102. Movement of piston 106 in cylinder 101 is retarded by a throttle 107 in a conduit connecting the parts of the cylinder chamber at both sides of the piston. A spring 104 interposed between lever 102 and casing 43 tends to return lever 102 and valve 99 to neutral position. Piston 106 is thereby moved relative to cylinder 101 and piston 100 stays in its adjusted position.

Movement of piston 100 causes a change of the tension of spring 109, to which it is connected by rod 108, and of the position of piston valve 110 which controls flow of control fluid through conduits 94 and 95 to and from conduit 42. The latter is connected with servomotors 40 and 41 individually comprising return springs 45, 46 respectively, which are so adjusted that a gradual rise of the pressure in conduit 42 causes opening of valve 38 and an increased flow of working medium through by-pass 37 of turbine 30 only after throttle valve 39, which is actuated by servomotor 41, has been fully opened. Movement of piston 98 to the left, as seen in Fig. 1, actuates the described part of regulator I in such a way that the pressure in conduit 42, adjusted by valve 110, increases; this pressure decreases upon movement of piston 98 to the right. Consecutive opening of valves 39 and 38 caused by increasing pressure at the inlet of charging compressor 22 causes a decrease of the pressure of the working medium at the outlet of turbine 22 and an increased speed of said turbine and of the compressor 35 driven thereby, whereby the pressure of the charging air is increased.

Vice versa, upon a reduction of pressure at the inlet of turbine 22, regulator I closes valves 39 and 38, thereby raising the pressure at the outlet of turbine 22 and slowing up its speed and that of charging compressor 35, whereby the pressure of the charging air is reduced.

If the plant operates at steady conditions, piston 98 is held in its middle position by means of springs 111 and 97.

The pressure of the charging air which is adjusted by regulator I in the manner described above acts through conduit 44 on the upper side of piston 113 of servomotor 114 forming part of regulator I, and moves the piston against the action of a spring 115. Piston 113 has a cam 117 connected thereto by piston rod 116, the cam actuating cam follower 118. The latter actuates, via a spring 119, a slide valve 120 which controls flow of a control fluid to and from the left side of piston 98 through conduits 76 and 77, respectively. Conduit 76 receives fluid at constant pressure from a conventional source and conduit 77 returns it thereto. Piston 98, which has been moved to the left by the rising pressure at the inlet of turbine 22, is thus returned to its neutral position upon an increase of pressure at the outlet of compressor 35.

Regulators I and II come to rest only when the servomotor pistons 78 and 98 are in their center or neutral positions. This is accomplished if, after a change of speed of prime mover 31 caused by a change of load thereon, the pressure of the working medium of the plant is adapted to the new load condition, by the described control steps.

Each change of pressure of the working medium in the intermediate gas heater 24 is transmitted through pipeline 58 to the bottom side of piston 122 of servomotor 56. The latter adjusts the fuel supply to heater 24 for steady load conditions. During the change from smaller to greater output, regulator III causes increased flow of control fluid through conduit 54 to the lower side of piston 121. This moves the piston upward and effects immediate increase of fuel supply through conduit 25 to heater 24 by opening fuel valve 27. The pressure of the working medium of the plant which is controlled by actuation of valves 48, 39 and 38 rises gradually and the pressure of the medium at the inlet of turbine 22 transferred through conduit 53 to the upper side of piston 121 returns the piston towards its previous position and reduces the fuel supply to heater 24 by closing valve 27. In the meantime, the pressure in heater 24 has increased and acts on the bottom side of piston 122, thereby opening valve 27 and increasing fuel supply to heat the increased amount of working medium passing through the heater. Fuel supply to the intermediate gas heater is thus controlled by the application of two subsequent control steps.

The pressure at the outlet of turbine 22 is also regulated by two control steps. Opening of valves 39 and 38 causes a lowering of this pressure, whereas the described control steps cause an increase of pressure in the entire plant eventually increasing the pressure at the outlet of turbine 22. The last mentioned increase of pressure exceeds the previous decrease. The pressure drop in the charging turbine 22, however, is increased because the pressure at its inlet is increased also.

A sudden increase of fuel supply to heater 24 for satisfying a sudden increase of load is permissible only within certain limits which are set by the temperature resistivity of the turbine blade material. In a plant which must absorb sudden load fluctuations, special provisions should be made to immediately increase the energy content of the plant. For this purpose, an air accumulator 123 is provided, from which compressed air can be blown into the circuit by opening a valve 124. This valve is operated by a servomotor 125 whose piston 126 is actuated by control fluid from conduits 127, 127a.

If a sudden slowing up of the machine 30 causes regulator III to move valve 63 for increasing the pressure of the control fluid in conduits 54 and 127, this increased pressure first lifts piston 121 of servomotor 52 to its extreme upper position. If the fuel supply increased thereby does not suffice to bring the speed of machine 30 back to normal, the pressure in line 127 will continue to rise until it can move piston 126 against the action of spring 128. This causes opening of valve 124 for admission of compressed air to the air circuit of and increasing the pressure in the plant.

Provision must also be made for preventing machine 30 from running too fast upon a sudden decrease of the load thereon. Two additional servomotors 129 and 130 are connected with conduit 127 which control a relief valve 131 and a valve 132, respectively, in pipeline 23. If, due to a sudden increase of speed of the prime mover unit 30, 31, the pressure in conduit 127 falls, relief valve 131 is opened and valve 132 is closed. This decreases or interrupts the supply of operating medium to turbine 30.

The invention provides a quickly responsive control which does not impair the operating efficiency of the plant, by compensating small and quickly passing load fluctuations by changing the heat supply to the working medium. This change has an immediate effect, whereas the pressure of the working medium changes slowly and follows load variations only at a great time lag. Losses caused by a quick change of the pressure conditions of the plant due to continual changes of the energy content of the plant are avoided by the system according to the invention.

The invention can be used also in connection with an open-cycle gas turbine plant as illustrated in Fig. 2. In this plant, air is drawn from the atmosphere by a compressor 140 and the compressed air is blown through pipeline 141 into heat exchanger 142 and therefrom through conduit 143 into the combustion chamber of gas heater 144. A portion of the oxygen of the air is used for burning fuel which is supplied to the gas heater through conduit 145 and burner 146. The working medium, heated to a high temperature in heater 144, is divided into a stream flowing through conduit 147 to the prime mover turbine 148 and into a stream flowing through conduit 150 into an auxiliary power turbine 151.

The portion of the working medium flowing through turbine 148 is expanded to substantially atmospheric pressure and thereby produces power to operate a machine 149 which, in the illustrated example, is an alternating current generator.

The portion of the working medium flowing through turbine 151 is also expanded to substantially atmospheric pressure and produces power for driving compressor 140.

Both portions of the working medium are reunited in conduit 152 and conducted into heat exchanger 142, where a portion of the heat still contained in the working medium is used for preheating the air entering the heat exchanger through conduit 141. Thereupon the working medium leaves the plant through exhaust duct 153.

For regulating the fuel supply to heater 144, a control means 173 is interposed in conduit 145; this control means is operated by a servomotor 154 whose piston 155 is actuated by pressure fluid supplied through conduit 156. The pressure of this fluid is regulated by an impulse producer device IV, which is surrounded by a dash-dot line in the diagrammatic showing of Fig. 2.

For starting the plant, a direct current electric machine 157 is connected with compressor 140. Its brushes can be displaced by means of a rod 158 actuated by a servomotor 159. A movement of servomotor piston 160, to which rod 158 is connected, in the direction indicated by + in Fig. 2, changes the operation of the machine from that of a generator to that of a motor. The electric current is supplied to and taken from machine 157 by conduits 161 which are also connected with a second direct current machine 162 which is connected for rotary drive with the machine 149. This permits exchange of energy between the prime mover group 148, 149 and the compressor group 140, 151, the latter being supplementally driven by power produced in the former or the former receiving power from the latter, depending on the setting of the brushes of machine 157 for operation as a motor or as a generator.

Servomotor 159 is actuated by pressure impulses produced by impulse producer IV in a control fluid conducted to and from the upper side of piston 160 by conduit 163. A throttle means 164 inserted in the latter and a pressure chamber 165 communicating with conduit 163 between the throttle 164 and the servomotor 159 cause delay of transmission of control impulses from the impulse producer to the servomotor 159.

The current produced by generator 149 is conducted to a power system 167 by conduits 166.

A resistance 168 is interposed in one of the conduits 166, the resistance being short-circuited by a coil 169 of a solenoid having a core 170. The latter moves a soft iron bolt 172 against the action of a spring 173 depending on the tension drop in resistance 168. Each movement of bolt 172 is transferred by a second spring 174 to a slide valve 175. The latter controls flow of a control fluid from a source, in which the pressure of the fluid is maintained and which is not shown as it is conventional and not part of the invention, through a conduit 176 and return of the fluid to the source through conduit 177, to and from conduit 156. The pressure of the fluid in conduit 156 corresponds to the tension of spring 174.

Increased electric current flows through resistance 168 caused by increased load on system 167, causing reduced fluid pressure below valve 175, which pressure is transmitted through conduit 156 to the top side of piston 155 of servomotor 154 and causes opening of fuel valve 178 and instant increase of fuel supply to heater 144. Vice versa, decreased load on system 167 produces instantaneously a reduction of fuel supply to the heater. Each change of load on prime mover group 148, 149 is thus instantaneously compensated by a change of temperature of the working medium operating turbine 148, as well as the compressor turbine 151.

In a plant according to Fig. 2, as in the plant shown in Fig. 1, it is not permissible to maintain the so regulated temperature until, by chance, another change of load re-adjusts the temperature of the working medium to the desired value, because a sustained excessively high temperature causes undue thermal stresses in the turbine blading and an excessively low temperature reduces the efficiency of the plant. Each load fluctuation of greater duration is therefore subsequently satisfied by changing the pressure of the operating medium, whereby the previously changed temperature is brought back to normal. For this purpose, the pressure of the control fluid which was adjusted by the actuation of slide valve 175 in dependence on the load on generator 149 is transferred through conduit 163 to the upper side of piston 160 of servomotor 159. This transfer, however, is delayed by throttle means 164 and pressure chamber 165. Displacement of the brushes of machine 157 is therefore effected slowly and gradually.

Upon lowering of the pressure in conduit 163 by the impulse producer IV because of an increase of the load on generator 149, piston 160 of servomotor 159 is slowly moved upward and the brushes of the direct current machine 157 are moved to change its operation from that of a generator to that of a motor receiving power from the prime mover group. This causes a gradual increase of the speed of compressor 140 and consequently an increase of the pressure of the working medium throughout the plant. The increased volume of working medium circulating through the plant absorbs the increased heat supply and the previously increased temperature of the medium is returned to normal. Vice versa, a reduction of the load on the prime mover unit causes slowing up of the compressor unit and a gradual reduction of the pressure and of the turn-over of the working medium, whereby the previously lowered temperature is returned to normal. By proper choice of the compressor characteristic, the temperature of the working medium can be controlled supplementally in dependence on the circulated volume of working medium so that, also at partial loads, the temperature of the working medium at the inlet of the turbine is such as to permit efficient operation of the turbine.

In the embodiment of the invention illustrated in Fig. 2 and described above, small and quickly passing load fluctuations are compensated almost instantaneously by a change of the amount of heat supplied to the plant, whereas the pressure conditions in the plant are changed slowly and follow changes of load at a substantial time lag, as is the case in the system according to Fig. 1. In this way, losses are avoided, which are caused by a continual change of the energy content of the plant due to changes of pressure of the working medium at quickly passing load variations.

The invention is not limited to the embodiments shown in Figs. 1 and 2. A person skilled in the art can apply the described control apparatus without difficulty to a fully closed-cycle gas turbine plant having at least one outside power turbine and at least one compressor turbine mechanically independent of the outside power turbine. The apparatus according to the invention can also be used in plants for driving a ship's propeller or a vehicle or machines other than those in the examples illustrated and described.

Though a compressed control fluid is employed in the illustrated embodiments of the invention for actuating the new control apparatus, the apparatus can be actuated as well by mechanical or electrical means.

I claim:

1. Apparatus for controlling the power output of a gas turbine plant, comprising a compressor for compressing the working medium of the plant, means for driving said compressor, a heater connected for medium flow with said compressor and heating the compressed medium, heat supply control means for said heater, a turbine connected for medium flow with said heater and expanding the compressed and heated medium for power production, a control impulse producer connected with and being responsive to the load on said turbine, a first control means connected with and actuated by said producer and connected with said heat supply control means for controlling the heat supply to said heater, a second control means connected with said producer for actuation thereby and connected with and controlling the means driving said compressor, and an impulse retarding device interposed between said producer and said second control means for delaying actuation thereof and of the control of the means driving the compressor relative to the control of said heat supply control means by said first control means.

2. Apparatus as defined in claim 1, comprising a pressure responsive means connected with said heater and responsive to the pressure of the working medium thereat and connected with said first control means for supplementally controlling said heat supply control means in dependence on the pressure of the working medium heated in said heater.

3. Apparatus as defined in claim 1, comprising pressure control means responsive to the medium pressure in the plant, medium flow control means interposed in the path of the working medium between said compressor and said turbine and connected with said pressure control means for controlling the flow of the working medium through the plant in dependence on the medium pressure.

4. Apparatus as set forth in claim 3, said pressure control means being also connected with said first control means for actuating it supplementally to the pulses produced by said impulse producer.

5. Apparatus for controlling the power output of a gas turbine plant, comprising a compressor for compressing the working medium of the plant, a first multi-stage gas turbine driving said compressor, a heater connected for medium flow with said compressor and heating the compressed medium, heat supply control means for said heater, a second multi-stage gas turbine mechanically independent of said first turbine and connected for medium flow with said heater for producing outside power by expanding the compressed and heated medium, a control impulse producer connected with said second turbine for producing control impulses in dependence on the load on said second turbine, a first control means connected with said producer for actuation by impulses produced thereby and connected with said heat supply control means for controlling the heat supply to said heater in dependence on the pulses produced by said producer, a by-pass on at least one of said turbines for by-passing working medium around at least the first turbine stage, a medium flow control device in said by-pass, a second control means connected with and actuated by said producer and connected with said flow control device for controlling it in dependence on the pulses produced by said producer, and an impulse retarding device interposed between said producer and said second control means for delaying control of said flow control means relative to the control of said heat supply means.

6. Apparatus for controlling the power output of a gas turbine plant, comprising a compressor for compressing the working medium of the plant, means for driving said compressor, a heater connected for medium flow with said compressor and heating the compressed medium, heat supply control means for said heater, a turbine connected for medium flow with said heater and expanding the compressed and heated medium for power production, a control impulse producer connected with and being responsive to the load on said turbine, a first control means connected with and actuated by said producer and connected with said heat supply control means for controlling the heat supply to said heater, a regulator for the means driving said compressor, and impulse retarding means connecting said impulse producer and said regulator for actuating the latter by the former delayedly in relation to the control of the heat supply to the heater, said regulator comprising means responsive to the pressure of the working medium in the plant for effecting actuation of said regulator in addition to said impulse producer.

7. Apparatus for controlling the power output of a gas turbine plant, comprising, in combination, two mechanically independent turbo-compressor units for compressing the working medium of the plant; a gas turbine mechanically independent of said units and receiving compressed working medium therefrom for producing outside power; heating means receiving compressed medium from said units, heat supply control means for said heating means; a control impulse producer responsive to the load on said gas turbine and connected with said control means for actuation thereof; impulse retarding means connected with said producer, a regulator for the pressure of the working medium of the plant connected with said retarding means and adapted to be operated by retarded control impulses from said producer; and a second regulator for the pressure of the working medium of the plant actuated by the pressures of the working medium produced by said units.

8. Apparatus as defined in claim 7, said first regulator being connected with and regulating one of said turbo-compressor units and said second regulator being connected with the other of said units for regulating the pressure of the working medium produced by the compressor of said other unit.

9. Apparatus for controlling the power output of a gas turbine plant, comprising a compressor for compressing the working medium of the plant, a first gas turbine driving said compressor, a heater connected for medium flow with said compressor and heating the compressed medium, heat supply means for said heater, a second gas turbine mechanically independent of said first turbine and connected for medium flow with said heater for producing outside power by expanding the compressed and heated medium, a control impulse producer connected with and responsive to the load on said second turbine, control means connected with said heat supply means and with said producer to be actuated thereby, impulse retarding means connected with said producer, a regulator connected with said retarding means and adapted to be actuated by retarded control impulses from said producer and connected with one of said turbines for regulating the operation thereof, and a second regulator responsive to pressure conditions of the working medium of the plant and connected with the other turbine for regulating operation thereof.

10. Apparatus as defined in claim 9, comprising by-pass means connected with at least one of said turbines for by-passing working medium around a first stage thereof, and valve means interposed in said by-pass and connected with one of said regulators to be operated thereby.

11. Apparatus as defined in claim 9, comprising a conduit for supplying working medium to one of said turbines, and valve means interposed in said conduit and connected with one of said regulators to be operated thereby.

12. Apparatus for controlling the power output of a gas turbine plant, comprising a compressor for compressing the working medium of the plant, means for driving said compressor, a heater connected for medium flow with said compressor and heating the compressed medium, a turbine connected for medium flow with said heater and expanding the compressed and heated medium for power production, a pressurized control fluid conduit, pressure control means responsive to the load on said turbine and interposed in said conduit for regulating the pressure of the control fluid therein in dependence on the load on said turbine, heat supply control means connected with said heater and comprising a first servomotor connected with said control fluid conduit and being responsive to the pressure of the fluid therein, regulating means for the means driving said compressor, a second, fluid pressure responsive, servomotor connected with said regulating means and with said fluid conduit for actuating said regulating means in accordance with the pressure of the control fluid in said conduit, and control fluid flow retarding means connected with said conduit between the points where said servomotors are connected to it for delaying actuation of the second servomotor relative to the actuation of the first servomotor.

13. Apparatus as defined in claim 12, said fluid flow retarding means consisting of a throttling device interposed in the control fluid conduit.

14. Apparatus as defined in claim 12, said fluid flow retarding means consisting of an air chamber communicating with said control fluid conduit.

WALTER TRAUPEL.

References Cited in the file of this patent
UNITED STATES PATENTS

| Number | Name | Date |
|---|---|---|
| 2,372,686 | Sédille | Apr. 3, 1945 |
| 2,459,709 | Lysholm | Jan. 18, 1949 |
| 2,544,235 | Pfenninger | Mar. 6, 1951 |
| 2,581,276 | Mock | Jan. 1, 1952 |